L. R. McGUIRE.
EXPANSIBLE BAG FOR VULCANIZING TIRES.
APPLICATION FILED APR. 27, 1921.
1,410,023.
Patented Mar. 21, 1922.
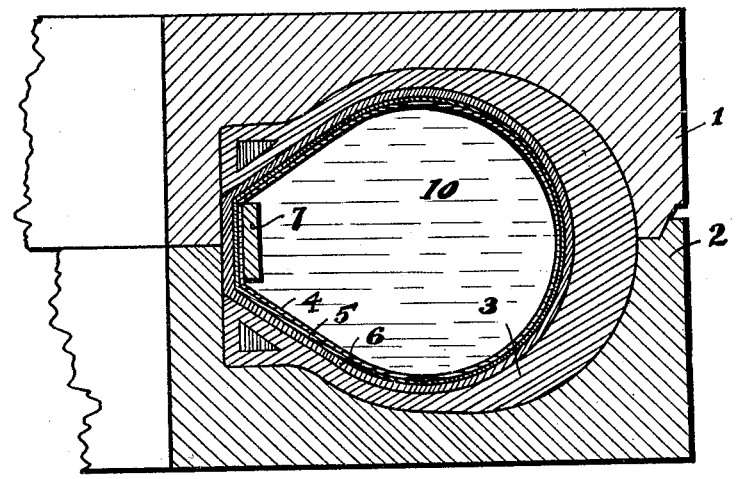
Fig. 1
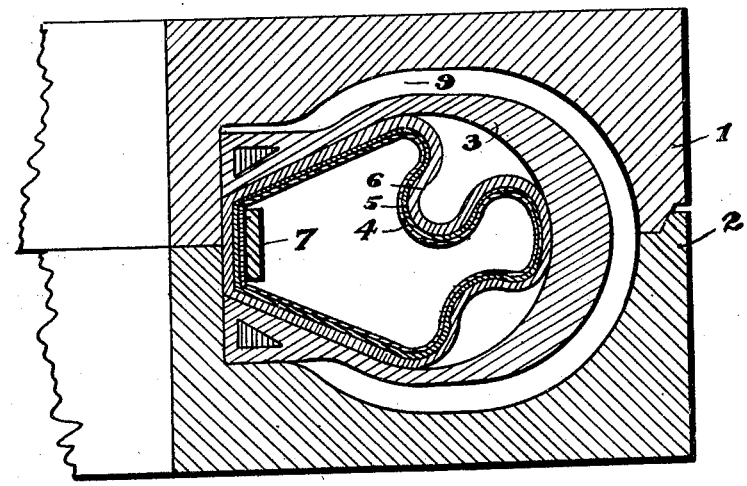
Fig. 2
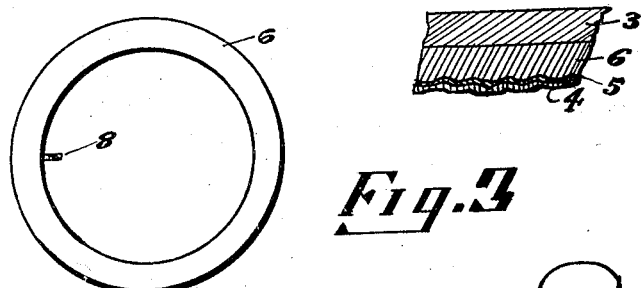
Fig. 3
Fig. 4
Inventor
Lee R. McGuire
By A. L. Ely
Attorney

UNITED STATES PATENT OFFICE.

LEE R. McGUIRE, OF AKRON, OHIO.

EXPANSIBLE BAG FOR VULCANIZING TIRES.

1,410,023.  Specification of Letters Patent.  Patented Mar. 21, 1922.

Application filed April 27, 1921. Serial No. 464,959.

*To all whom it may concern:*

Be it known that I, LEE R. McGUIRE, a citizen of the United States, residing at Akron, in the county of Summit, State of Ohio, have invented certain new and useful Improvements in Expansible Bags for Vulcanizing Tires, of which the following is a specification.

This invention relates to annular expansible cores or bags which are used during the vulcanization of tires. It is the general practice in vulcanizing tires while held under internal pressure, to insert within the tire a core or bag which is capable of expansion by fluid pressure applied internally of the bag while it is in a mold during vulcanization, and it is the purpose of this invention to provide a new and useful form of bag for this purpose which will obviate the difficulties and disadvantages which are encountered in bags at present in use.

The ordinary or common form of air bag comprises a plurality of layers of rubberized fabric provided on its interior with a heavy layer of rubber composition. These bags are made in continuous annular form, and are of a size equal to or smaller than the size of the uncured tire, and when placed in the tire and expanded by fluid pressure, cause the tire to be stretched to fill the mold cavity. As the bag is placed in each tire on which it is cured, it must be deformed from its circular condition to enable it to be placed in the tire. As the bag is subjected to the vulcanizing temperature during the curing of each tire, the rubber soon becomes brittle and will give way at the points at which it has been bent, causing loss of bag and often the loss of the tire. The bags are expensive to manufacture, and the failure of the bags is one of the largest items in the manufacture of tires which are cured on the internal expansion principle.

In order to find a substitute for the expensive and unsatisfactory bags formed as described, attempts have been made to devise metallic cores, expansible by fluid pressure. As far as known to me, all the prior attempts to produce a metallic expansible curing bag have been failures, due to the fact that in prior constructions there have been disadvantages of such importance as to prevent their practical use.

The faults in prior metallic bag constructions have been due to many causes. Metallic bags of prior construction, which have utilized the expansion of the metal in the walls of the bag, have lacked uniformity of expansion, due to the irregularity in section with which the bag will expand. The pressure of the fluid in the interior of the bag, in order to obtain any expansion of the metal is necessarily very high, and is of such intensity as to create tensile strains in the metallic shell in excess of the "yield point" of the material. Due to the necessity of distorting the bag in removing it and replacing it in the tire, cracks or weak spots are developed in the bag, which weak spots assume all of the stretch which must be given to the bag to enable it to fill out the tire in the mold cavity. Those weak spots inevitably give way under the excessive fluid pressure and in addition create uneven pressure areas.

A further attempt to utilize a metallic expansible core is distinguished by the formation of reentrant angles in the surface of the bag. The use of such bags has required a high degree of internal pressure, which in combination with the fact that the reentrant portions of the bag must be made of relatively thin flexible material, has caused the reentrant portions of the bag to collapse. In order to obtain circumferential expansion about the tire, the bags of this type have to be made in a number of complicated sections or segments, which not only introduce an expensive manufacturing cost, and a complicated assembling operation but each section must be closed at its ends, which causes an unequal expansion about the tire, resulting in the permanent formation in the finished tire of undesirable irregular sections.

It is the purpose of my present invention to combine the desirable properties of the fabric bag with the desirable properties of a metallic bag in such a way that the tire will be evenly expanded and that the bag will be practically indestructible, being capable of being bent or twisted in removing from the tire, without permanent injury to the bag, the material of which the bag is composed, being unaffected by the heat of vulcanization.

In the drawings accompanying the application is shown one form or embodiment of my invention, it being understood that while the showing and description is detailed as is necessary to enable one skilled in the art to practice the invention, the invention is not confined to the details shown, but may be varied or modified within the scope of the appended claims.

In the drawings:

Fig. 1 is a section through a mold showing a tire placed therein provided with my improved form of expansible core, expanded as in the vulcanizing operation.

Fig. 2 is a cross section similar to Fig. 1, showing the tire and core in unexpanded condition.

Fig. 3 is an enlarged detail of a fragment of the bag.

Fig. 4 is an elevation of the bag removed from the mold.

In the drawings 1 represents the upper half and 2 the lower half of a tire vulcanizing mold, the halves of the mold being hollowed out to form the tire cavity 9. The tire is indicated by the numeral 3, being shown in Fig. 1, expanded by fluid pressure to fill out the mold cavity in Fig. 2 as placed in the mold preparatory to being expanded, it being noted that the area of the mold cavity is greater than the area of the tire before expansion.

The expansible core is placed within the tire and is constructed of such material that it can be freely bent and distorted to enable it to be placed within the tire. While the particular construction may be varied, I make use of an inner annular shell 4 of a material which is non-elastic, will easily bend without breaking or cracking, which is capable of holding an expanding fluid without leaking and which is not affected by the temperature of vulcanization. A material suitable for this purpose, is any suitable soft ductile metal having a high degree of flexibility and a maximum strength, preferably rolled or drawn annealed copper, which may be of a thickness approximately one-hundredth of an inch. Such a material is admirably suited for the purpose. It can be bent and deformed so as to be removed from or replaced within the tire and it will not leak or deteriorate under the influence of the vulcanizing temperature.

The copper bag is capable of being expanded under a relatively low fluid pressure, requiring but little more pressure than that required to expand a fabric or rubber bag. It will be found however, that numerous small wrinkles will occur in the copper sheet and unless means are provided to overcome this result, these wrinkles will be impressed upon or reproduced in the interior of the tire, which would be objectionable. Such wrinkles are illustrated in exaggerated form in Fig. 3 of the drawing. To overcome this objectionable feature, I propose to cover or line the copper bag with a relatively thin ply or plies of pliant material forming a pad for the outside of the bag, preferably a fabric covering, 6, which is held to the surface of the copper bag by a layer of adhesive 5, which is capable of withstanding the heat of vulcanization, such for example as Nyal glue and glycerine of proper proportions. The layer of pliant material 6, not only serves to reduce or absorb the wrinkles so that they are not transmitted to the tire, but also serves as a protector for the thin metallic bag 4, preventing it from becoming scraped or worn in the rough handling to which it is subjected.

The expanding fluid 10 may be introduced in any suitable manner, an ordinary valve stem 8 being shown for this purpose.

About the interior or base of the bag, I prefer to attach by riveting, soldering, brazing or by any other suitable means, a resilient spring tempered metallic ring or hoop 7, preferably of steel which reinforces the inner circumference of the bag. The functions of this ring are to prevent the thin metallic core or bag from being bent or collapsed in removal from the tire along the same section, which if done repeatedly would weaken the bag at this point and cause premature failure. The resilient ring 7 is designed of such proportions as to neutralize the aforesaid tendency, since the greater portion of the effort necessary to collapse the bag is required in overcoming the resistance of the ring when inserting or removing the bag from the inside of the tire casing. The ring has a further useful function in that it prevents undue distortion of the core while being removed from or replaced in the casing, as it resists a change in shape from circular to elliptical in almost direct proportion to the amount of the change.

As a further useful function of the ring 7, it will be found that the ring 7 assists in the maintenance of the bag in circular form on its inner circumference, which is highly desirable to insure the proper positioning of the bag inside the tire casing and prevents it becoming pinched during the closure of the two halves of the mold 1 and 2.

It will be noted from Fig. 1 that when the tire casing is in fully expanded condition, during vulcanization, the bag has been inflated to such an extent as to eliminate the large irregularities in its contour, which have been occasioned by the collapsing of the bag to enable it to be inserted within the tire. While it is my intention to expand the bag by the internal fluid 10 under pressure, it is not my intention to stretch the material of the bag, in fact the outer area or perimeter of the bag is equal to the inner area of the tire casing. I do not rely upon any stretching of the material of the bag, but solely upon the proper shaping of the metallic layer 4. As a result, there is obtained a uniform pressure on all parts of the casing and when the bag is filled out there are no reentrant angles which might collapse under the fluid pressure. Furthermore, when the expansible core of my invention has reached the limit of expansion within the tire, further inflation is impossible in which condition the fluid bag becomes the equivalent in function to the rigid iron core commonly used during the vulcanization of the non-expanded type of tire, forming a complete single annular chamber within the tire.

As the dimensions of the bag are the same as the interior of the cavity which it is called upon to fill, it is evident that the only strains to which the walls of the bag are subjected, are those created by the relatively small pressure, necessary to overcome the resistance of the bag to inflation and the resistance of the tire to the stretching action and I am therefore enabled to use in the walls of the bag material having a high degree of flexibility and of low tensile strength, such a requirement being met by the material which I have described.

By the judicious combination of elements in the construction of the expansible core as shown, I have obtained a superior form of expanding bag for use in vulcanizing tires under internal pressure, the operation and functions of which are new in the art, and I am therefore, entitled to a full range of equivalents and to modifications within the broad scope of my invention.

I claim:

1. An expansible core for use in vulcanizing tires under internal pressure, the core having non-stretchable walls so that the external area of the bag is equal at all times to the internal area of the tire as vulcanized, and means for expanding the core by fluid pressure.

2. An inflatable bag for use in vulcanizing tires in expanded condition under internal pressure, the core having non-stretchable walls so that the external area of the bag is equal in inflated or deflated condition, to the internal area of the tire in expanded condition.

3. An inflatable core for use in vulcanizing tires in expanded condition under internal pressure, the walls of the bag being unstretched when inflated in the vulcanizing operation.

4. An inflatable core for use in vulcanizing tires under internal pressure, the walls of the core being unstretched when inflated, and at all times equal in surface dimensions to the interior of the tire as vulcanized.

5. An expansible core for use in vulcanizing tires under internal pressure, the external area of the expansible portion of the core being equal at all times to the internal area of the confining means when the core and tire are in position for vulcanization, and means for expanding the core by fluid pressure.

6. An inflatable core for use in vulcanizing tires under internal pressure, the external area of the expansible portion of the core being equal in inflated and deflated condition to the internal area of the confining means when the core and tire are in position for vulcanization.

7. An inflatable core for use in vulcanizing tires under internal pressure, the expansible portion of the core being unstretched when inflated, and equal at all time in surface dimensions to the internal surface dimensions of the confining means, when said core and confining means occupy the relative position adapted for vulcanization.

8. A fluid expansible core for use in vulcanizing tires under internal pressure, the walls of the core comprising a layer of flexible sheet metal, the said walls filling the interior cavity of the tire as vulcanized without stretching.

9. A fluid expansible core for use in vulcanizing tires under internal pressure, the walls of the core coinciding with the interior cavity of the finished tire without stretching.

10. An expansible core for use in vulcanizing tires under internal pressure, the walls of the core comprising a layer of flexible sheet metal, the said walls coinciding with the interior cavity of the tire as vulcanized without stretching and means for expanding the core by fluid pressure.

11. An expansible core for use in vulcanizing tires comprising an outer layer of sheet metal, without reentrant portions, and of dimensions sufficient to fill the interior cavity of tire as vulcanized without stretching the metal and means to expand the core by fluid pressure.

12. An expansible core for use in vulcanizing tires, comprising a thin flexible layer of sheet metal and a covering layer of softer pliant material.

13. An expansible core for use in vulcanizing tires, comprising a thin flexible, non-stretchable layer of sheet metal, and a layer of pliant flexible material interposed between the interior of the tire and the exterior of sheet metal layer adapted to absorb the superficial irregularities of the sheet metal.

14. An expansible core for use in vulcanizing tires, comprising a thin flexible layer of sheet metal, and a layer of fabric secured to the exterior surface of the sheet metal.

15. A flexible sheet metal expansible core for vulcanizing tires, and a relatively stiff spring metal ring on the internal circumference of the core.

16. A flexible expansible bag, the walls of which are composed of non-stretchable metal and a relatively stiff spring metal ring secured about the interior circumference of the bag.

17. An expansible bag, the walls of which comprise a flexible, non-stretchable sheet metal layer, and a fabric covering layer, and a relatively stiff spring metal ring secured about the base of the bag.

18. An annular core for vulcanizing tires, said core having walls of thin flexible, but non-stretchable material, the dimensions of which coincide with the internal dimensions of the tire as vulcanized, a relatively stiff spring metal ring about the base of the core, and means for introducing fluid under pressure to the interior of the core.

19. An annular core for vulcanizing tires, said core having walls of thin flexible, but non-stretchable metal, and a layer of fabric covering said walls, a relatively stiff spring metal ring about the base of the core, and means for introducing fluid under pressure to the interior of the core.

20. An expansible core for use in vulcanizing tires comprising a layer of thin flexible sheet metal and a layer of pliant flexible material interposed between the interior of the tire and the sheet metal layer adapted to absorb the superficial irregularities of the sheet metal layer.

21. An expansible core for use in vulcanizing tires comprising a layer of thin, non-elastic, flexible sheet metal, forming a complete annular chamber within the tire.

22. An expansible core for use in vulcanizing tires, comprising a layer of thin, non-elastic and non-stretchable, flexible sheet metal forming a complete single annular chamber within the tire.

23. An expansible core for use in vulcanizing tires, comprising a layer of thin, flexible sheet metal forming a single complete annular chamber within the tire, and reinforcing means on the interior circumference of the core to maintain it in circular form.

24. A vulcanizing core having a metallic fluid containing element and a padding and protective layer of pliable material secured to the exterior thereof.

25. An expansible core for use in vulcanizing tires under internal pressure, the expansible portion whereof is comprised of flexible metallic and pliant material in combination.

26. A core for use in vulcanizing tires, comprising a fluid containing bag, and a hoop of spring metal secured to the inner circumference of the bag and serving to maintain its inner circumference in true circular form.

LEE R. McGUIRE.